April 30, 1963  W. R. BEAM  3,088,105
RADAR
Filed June 12, 1958  2 Sheets-Sheet 2

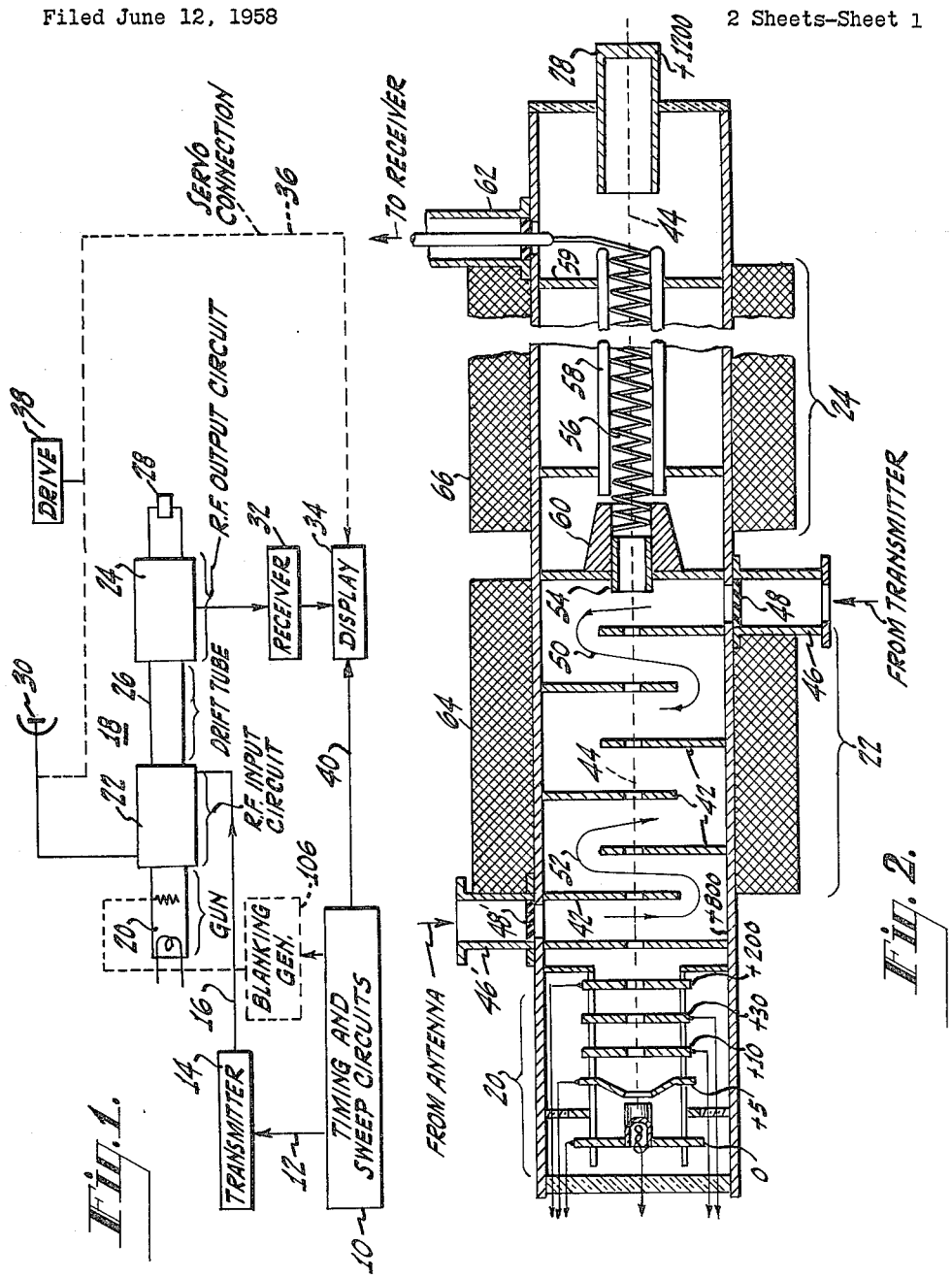

INVENTOR.
WALTER R. BEAM
BY
ATTORNEY

United States Patent Office 3,088,105
Patented Apr. 30, 1963

3,088,105
RADAR
Walter R. Beam, Princeton, N.J., assignor to Radio Corporation of America, a corporation of Delaware
Filed June 12, 1958, Ser. No. 741,485
21 Claims. (Cl. 343—5)

The present invention relates, in general, to radar and, more particularly, to improved duplexing circuits for radar systems.

Conventional pulsed radar systems employ a single antenna both for reception and transmission. The connection between the antenna, transmitter, and receiver normally includes a gas-filled tube known as a TR (transmit-receive) tube or switch. During transmission, the tube fires (conducts) and the transmitter energy is prevented, or substantially prevented, from reaching the receiver. During reception, the gas in the tube becomes deionized and the received echoes pass to the receiver. Transmission line lengths are made such that little power passes to the transmitter during reception.

Unfortunately, TR tubes are not perfect switches. During transmission, a portion of the transmitted power, known as leakage power passes through the TR tube to the receiver and may damage the latter's delicate input stage (usually a crystal). The arc formed when the TR tube fires deteriorates the TR tube arc electrodes and causes the tube eventually to fail. Finally, the TR tube suffers from slow deionization and this prevents the detection of echoes at short ranges.

An object of the present invention is to provide an improved form of duplexer which substantially overcomes the disadvantages outlined above.

Another object of the invention is to provide a simplified radar system which does not require a conventional TR tube.

Yet another object of the invention is to provide an improved radar system which is useful at short ranges and which can employ short pulses.

Still another object of the invention is to provide an improved radar system in which the entire duplexing and receiving function is performed in a single tube, thereby greatly simplifying the radar system.

In a preferred form of the present invention, a traveling-wave tube performs the duplexing function. (As used here, the term "traveling-wave tube" is generic to both forward and backward-wave amplifiers of the traveling-wave type.) The traveling-wave tube has a portion which amplifies in one direction and does not amplify in the other. The transmitter is connected to the antenna through this portion of the traveling-wave tube in its non-amplifying direction. The connection between the antenna and receiver includes this portion of the traveling-wave tube, however, the connection is in the amplifying direction.

In a specific form of the invention, the traveling-wave tube is one of the "cascade" type. The one portion above includes a slow-wave structure such as a folded transmission line. Downstream from the slow-wave structure is a second slow-wave structure such as a helix or a second folded transmission line. The two slow-wave structures are isolated from one another by a hollow, cylindrical, drift tube. The transmitter is connected to one point on the slow-wave structure and the antenna to another point on the structure, the two points being arranged so that transmitted power passes along the slow-wave structure in a direction opposite to the amplifying direction. The receiver is connected to the second slow-wave structure and, with respect to the antenna, is in the amplifying direction of the traveling-wave tube. Accordingly, an echo received by the antenna is amplified by the traveling-wave tube.

The output of the second slow-wave structure consists of amplified radio-frequency pulses and they may be applied to the mixer of a conventional radar receiver. In another form of the invention, a local oscillator signal may be injected into the second slow-wave structure to produce intermediate-frequency pulses. In this case, the first receiver stage can be an I.F. stage—no mixer being needed. In a third form of the invention, the output of the second slow-wave structure may be converted by a circuit downstream of the second slow-wave structure to an intensity-modulated electron beam. The latter may be deflected in conventional fashion in accordance with the rotation of the radar antenna and displayed on a cathode ray tube screen located at the end of the traveling-wave tube.

In the embodiments of the invention described above, the first and second slow-wave structures may comprise forward-wave amplifiers or backward-wave amplifiers, or one may be a backward-wave amplifier and the other a forward-wave amplifier. The choice depends, in each case, upon the type of performance desired, a forward-wave amplifier providing broad-band characteristics and a backward-wave amplifier having voltage-tunable characteristics.

The invention will be described in greater detail by reference to the following description taken in connection with the accompanying drawing in which:

FIG. 1 is a diagram, partially in block and partially in schematic form, of one embodiment of a radar system according to the present invention;

FIG. 2 is a schematic drawing of one type of a traveling-wave tube which may be used in the system of FIG. 1;

Throughout the figures, similar reference numerals are applied to similar parts.

Figure 3:
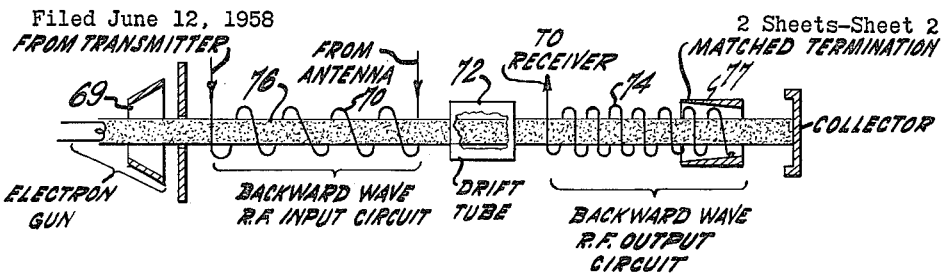
FIG. 3 is a schematic drawing of another type of traveling-wave tube which may be used in the system of FIG. 1.

The radar system of FIG. 1 includes timing and sweep circuits 10 which produce at lead 12 timing pulses for triggering the transmitter. The transmitter 14 may be one of conventional type and may include a high-powered modulator stage and an output stage such as a magnetron, klystron, traveling-wave tube or the like. The output of the transmitter consists of high-power radio-frequency pulses at lead 16. These are applied to one terminal of a slow-wave structure of traveling-wave tube 18.

Traveling-wave tube 18 is one of the cascade type. It includes an electron gun shown schematically at 20, an R.F. input circuit 22 including a first slow-wave structure, an R.F. output circuit 24 including a second slow-wave structure, and a drift tube 26 for isolating the first and second slow-wave structures. A collector 28 is at the end of the tube opposite the electron gun end.

The slow-wave structures of circuits 22, 24 may be folded transmission lines, helices, or other conventional structures. However, since the first slow-wave structure is connected directly to the transmitter, it is preferably one which is capable of handling large amounts of power, and may be a folded waveguide, for example. The second slow-wave structure 24 handles only relatively small amounts of power and can be a helix, however, other slow-wave structures may be used instead.

It is assumed in the present discussion that circuits 22 and 24 both amplify in the forward direction. As already mentioned, the transmitter 16 is connected to the downstream end of the first slow-wave structure. Antenna 30 is connected to the upstream end of the first slow-wave structure. Since the tube amplifies in the forward direction, the transmitted signal is not amplified in R.F. input circuit 22. However, an echo received by the antenna is applied to the end of the slow-wave structure closest the electron gun, and it is accordingly amplified. Receiver 32 is connected to the end of the R.F. output circuit 24 closest the collector. Accordingly, the signal passing from the R.F. input circuit 22 through the R.F. output circuit 24 to the receiver is amplified by both circuits.

The video pulse output of receiver 32 may be applied in conventional fashion to display device 34 which may be a PPI indicator. The latter may be synchronized with the antenna rotation by the connection illustrated at 36. This may comprise a servo connection from the antenna or the antenna drive motor 38 to, for example, the rotating deflection means of the cathode ray tube indicator. The sweep voltage for the indicator is produced in circuit 10 and applied to the deflection coil of the indicator via lead 40. The sweeps are at the radar system pulse repetition frequency and are synchronized with the transmitted pulses in conventional fashion.

The operation of the system of FIG. 1 may be better understood by referring to FIG. 2. This illustrates in greater detail the traveling-wave tube structure which prevents the transmitted power from reaching the receiver and, in addition, amplifies a received echo and applies it to a receiver. It is to be understood that the illustration is schematic. Relative D.C. voltages are noted on the drawing by way of illustration. The tube envelope is normally grounded and the cathode and collector negative and positive with respect thereto.

The electron gun structure is shown schematically at 20. Preferably, the gun is one of the low noise type which is described in detail in an article appearing on page 344 of the September 1952 issue of the RCA Review. The tube R.F. input circuit 22 includes a folded waveguide. In brief, the folded waveguide consists of interleaving metallic plates 42, each formed with an aperture through which the focused electron beam 44 passes. The folded waveguide is coupled to the transmitter at its downstream end by an input waveguide section 46. A dielectric window 48 allows the high input power to pass into the folded waveguide and maintains the vacuum within the traveling-wave tube. The input power passes down the waveguide in the direction indicated by arrow 50. As already mentioned, the system parameters are such that the traveling-wave tube portion 22 does not amplify in the direction of arrow 50 so that there is no or substantially no amplifying interaction between the slow-wave and the electron beam. As a matter of fact, if the transmitter power is sufficiently high, the electron beam may be blocked by the radio-frequency pulses and thereby prevented from reaching the second slow-wave structure described below. This, however, is not disadvantageous since the instant the pulse terminates, the beam is again turned on.

The power from the transmitter passes through waveguide section 46, through the folded waveguide, and to waveguide section 46'. The latter may be identical to waveguide section 46 and may include a dielectric window 48' which performs the same function as window 48. Waveguide section 46' leads to the antenna through a conventional rotating joint (not shown).

Echoes received by the antenna are applied to waveguide section 46' and travel down the folded waveguide in the direction of arrow 52. This direction is the amplifying direction of R.F. input circuit 22 so that there is interaction between the slow-wave and the electron beam, and the input pulses are amplified.

Drift tube 54, which is downstream from the folded waveguide, consists of a hollow, metallic cylinder. Its diameter is only slightly greater than that of the beam and its length is sufficient substantially to isolate the two slow-wave structures. In other words, the drift tube dimensions are such that it acts like a cut-off waveguide and prevents any leakage of transmitter power to the output slow-wave structure. Thus, the only coupling between the two structures is via the electron beam. Also, the drift tube transforms the velocity and current modulation which exist on the beam at the end of the first slow-wave structure so as to optimize the output signal. While shown as a hollow cylinder, in the general case element 54 could consist of any combination of propagating and non-propagating circuits.

The slow-wave structure of amplifier section 24 is shown as a helix 56 and it is supported along its extent by ceramic rods 58 and supports 59. The helix is terminated at its upstream end in a matched termination 60 and at its downstream end in a coaxial line output connection 62. The collector is shown at 28. The coils which produce the magnetic fields for the amplifiers 22 and 24 are shown at 64 and 66, respectively. The tube may also include means for attenuating the backward wave (not shown).

In operation, the received pulses which are amplified in the first slow-wave structure are coupled via the modulated electron beam to the slow-wave structure of amplifier section 24. There they are further amplified and applied via the coaxial output connection 62 to the receiver. The signal at coaxial line 62 is highly amplified and may be applied to the mixer or first detector of the receiver.

Figure 5:
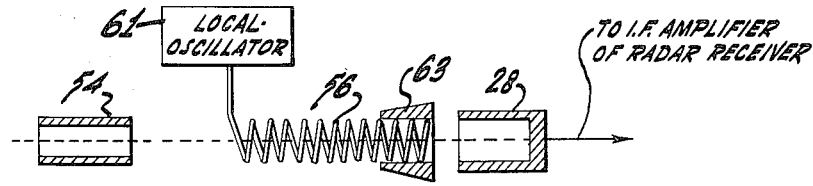
FIG. 5 is a schematic drawing of part of a modified form of the invention.

A modified form of traveling-wave tube is shown in FIG. 5. Only the output slow-wave structure 56 and associated elements are shown. The output slow-wave structure is connected at its upstream end to a local oscillator 61 and at its downstream end to a matched termination 63. The output signal may now be taken from the collector 28 and it consists of an intermediate-frequency signal. This may be applied directly to the I.F. amplifier of the receiver; the mixer stage may be eliminated.

Although the system illustrated in FIG. 1 employs a traveling-wave tube having two forward wave amplifier sections, other forms of the invention are possible. Thus, both sections may be backward wave amplifiers, if desired, or one section may be a backward-wave amplifier and the other a forward-wave amplifier. Moreover, although in the embodiment of FIG. 2 the first section is a folded transmission line and the second a helix, other types and other combinations of slow-wave structures may be used instead.

FIG. 3 illustrates schematically a form of the invention in which the two slow-wave structures are helices and both operate as backward-wave amplifiers. The electron gun is shown at 69, the first slow-wave structure at 70, the drift tube at 72, and the second slow-wave structure at 74. The electron beam is shown schematically at 76. The energy from the transmitter is applied to the helix 70 in the non-amplifying direction of the helix. The energy from the antenna is applied to helix 70 in the amplifying direction. The second section of the traveling wave tube is matched at its downstream end in a matched termination 77. The output of the helix 74 is taken from the upstream end thereof since this section of the traveling wave tube is also a backward-wave amplifier.

In a form of the invention in which the first section of the traveling wave tube is a forward-wave amplifier and the second section a backward-wave amplifier, the first section may be like the one of FIG. 1 and the second section a forward-wave coupled cavity resonator slow-wave structure. In a form of the invention in which the first section of the traveling-wave tube is a backward-wave amplifier and the second a forward-wave amplifier, the first section may be like the one shown in FIG. 1 with input and output reversed, and the second section like the one in FIG. 1. Many other combinations are, of course, possible.

Figure 4:
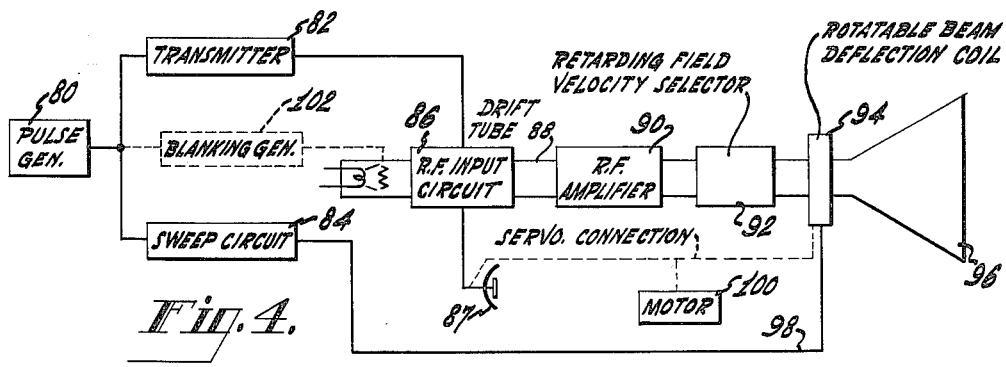
FIG. 4 is a block and schematic diagram of a second embodiment of a radar system according to the present invention, this one employing a single tube for the duplexing, receiving, and display functions.

A form of the invention in which a single tube performs the duplexing, receiving and display functions is shown in FIG. 4. The entire radar system may include a pulse generator 80 which applies synchronizing pulses to the transmitter 82 and to sweep circuit 84. The transmitted pulses are applied to the R.F. input circuit 86 which may consist of a slow-wave structure like the one shown in FIG. 2. The arrangement of FIG. 4, like the one of FIG. 2, employs forward-wave amplification both for the first section of the tube and the second section of the tube. Antenna 87 is connected to the upstream end of the R.F. input circuit 86. The R.F. input circuit is connected through a drift tube 88 to a R.F. amplifier circuit 90. Amplifier 90 may include a slow-wave structure similar to the helix 56 of the tube of FIG. 2. The electron beam next passes through a retarding-field velocity selector 92 of the traveling-wave tube. The structure of the velocity selector is shown in greater detail in FIG. 6 which is explained below. The output of this circuit is an intensity-modulated electron beam, modulated at video frequency. It passes through a section of the tube about which is a rotatable, deflection coil 94. The end of the tube is expanded like a conventional cathode ray tube to form a viewing screen 96. The surface of the screen on which the electron beam impinges is coated with a phosphor in conventional cathode ray tube fashion.

The sweep signals from circuit 84 are applied to the rotatable deflection coil 94 via lead 98. The antenna and deflection coil are driven by means of a motor 100. The link between the motor or antenna and the rotatable deflection coil may be conventional servo link including a synchro-transmitter and synchro-receiver.

In operation, the transmitted pulses are applied to the antenna through the first section 86 of the traveling-wave tube in the non-amplifying direction. The pulses received by antenna 87 are applied to the R.F. input circuit 86 in the amplifying direction. Accordingly, they are amplified in sections 86 and 90. The retarding-field velocity selector 92 detects the amplified radio-frequency pulses so that the output of this stage consists of an electron beam, the intensity of which varies in accordance with the video component of the amplified radio-frequency signal. The beam deflection means 94 produces radial deflection of the electron beam in usual PPI fashion to produce an area display on the screen 96.

Figure 6:
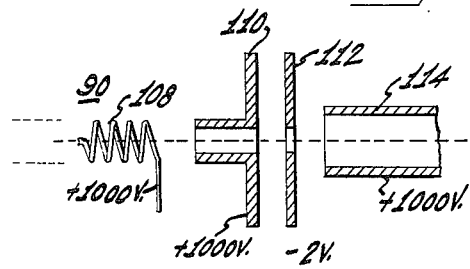
FIG. 6 is a schematic drawing of the velocity selector of FIG. 4.

The retarding-field velocity selector 92 is shown in more detail in FIG. 6. The end of the slow-wave structure of the R.F. amplifier 90 is shown schematically at 108. Beyond the helix is an annular electrode 110 formed with a flange at one end thereof. A retarding electrode 112 is beyond the electrode 110 and a third electrode 114 is located beyond the retarding electrode. Typical values of voltages are shown. Thus, the first electrode may be at +1,000 volts, the second at −2 volts, and the third at +1,000 volts.

In operation, the electrode beam with R.F. current modulation and velocity modulation leaves the helix 108 and enters the aperture in the first electrode 110. In the absence of an R.F. signal, the beam has an energy of 1,000 volts. It is decelerated by the field between electrodes 110 and 112 and cannot pass through the aperture in electrode 112. If the beam has R.F. modulation on it, some of the electrons will have a greater energy than a 1002 volts so that these can pass through the aperture. Thus, the beam is effectively detected since only the modulation components thereon which are sufficient to increase the electron beam energy pass through the electrodes and appear as a modulation on the electron beam. As explained above, the intensity modulated electron beam is deflected and used to illuminate the phosphor screen.

With the arrangement shown in FIGS. 1 and 4, there should be no interaction or very little interaction between the transmitted pulse and the electron beam. However, one can, if desired, include a means for blanking the electron beam during the transmission period. One way of doing this is to produce a blanking signal and applying it to the control grid of the electron gun tube during the transmission interval. An arrangement of this type is illustrated by dashed block 102 in the embodiment of FIG. 4, and dashed block 106 in the embodiment of FIG. 1.

Although the arrangement of FIG. 4 employs a rotatable deflection coil, fixed deflection means may be used instead. Such means are not described as they are conventional.

Circuits 86 and 90 may be forward-wave amplifiers or backward-wave amplifiers, or one may be a forward-wave amplifier and the other a backward-wave amplifier. As in the case of the embodiment of FIG. 1, the slow-wave structure of circuit 86 should be one which is capable of handling large amounts of power, such as a folded waveguide.

What is claimed is:

1. In a radar system including a transmitter for producing radio-frequency pulses, and an antenna for radiating the pulses and receiving echoes from reflecting objects, a duplexer comprising an electron beam tube at least one portion of which is a traveling-wave amplifier which amplifies in one direction and not in the other, said amplifier including a slow-wave structure through which the electron beam passes, a first connection to said slow-wave structure for said transmitter, and a second connection to said slow-wave structure for said antenna, the direction from said first to said second connections being opposite to said amplifying direction.

2. In a radar system as set forth in claim 1, said electron beam tube further including a second traveling-wave amplifier having a slow-wave structure through which the electron beam passes after leaving the first slow-wave structure.

3. In a radar system as set forth in claim 2, further including a connection to the slow-wave structure of said second traveling-wave amplifier from which a signal amplified by said second traveling-wave amplifier may be taken and applied to a receiver of said radar system.

4. In a radar system as set forth in claim 2, said electron beam tube further including means for detecting the signal on the electron beam after it passes through the second traveling-wave amplifier to thereby produce an intensity modulation on said electron beam, a screen beyond said detector means on which said electron beam impinges after leaving said detector means, and means for sweeping said electron beam across said screen.

5. A duplexer for a radar system having an antenna which is common both to the radar transmitter and receiver comprising, a traveling-wave tube having one portion which amplifies in one direction and not in the other direction; a coupling circuit between the tansmitter and antenna through said one portion of said traveling-wave tube in said other direction; and a coupling circuit between the antenna and receiver including said one portion of said traveling-wave tube and in the amplifying direction thereof.

6. A duplexer for a radar system having an antenna which is common both to the radar transmitter and receiver comprising, a traveling-wave tube having a portion which amplifies in one direction and does not amplify in the opposite direction, a second portion which amplifies in a given direction, isolating means between said two portions for effectively isolating them from one another, and means for generating an electron beam and directing it through said one portion, said isolating means and said second portion, in the order named; a coupling circuit between the transmitter and antenna through said one portion of said traveling-wave tube and in a direction opposite to the amplifying direction thereof; and a coupling circuit between the antenna and receiver through said traveling-wave tube from the first portion thereof through said isolating means and through the second portion thereof, the coupling through said traveling-wave tube being in the amplification direction thereof.

7. A duplexer as set forth in claim 6, wherein one portion of said traveling-wave tube comprises a backward-wave amplifier and the other comprises a forward-wave amplifier.

8. A duplexer as set forth in claim 6, wherein both portions of said traveling-wave tube comprise forward wave amplifiers.

9. A duplexer as set forth in claim 6, wherein both portions of said traveling-wave tube comprise backward-wave amplifiers.

10. A duplexer as set forth in claim 6, wherein said isolating means comprises a hollow, cylindrical, conductive tube.

11. A radar system comprising, in combination, transmitter means for generating radio-frequency pulses; antenna means for radiating said pulses and receiving echoes from reflecting objects; receiver means for amplifying the echoes; and means for connecting the antenna means both to the receiver means and to the transmitter means comprising, a traveling-wave tube having a given amplification direction, the transmitter means-to-antenna means connection to the traveling-wave tube being opposite to the amplification direction and the receiver means-to-antenna means connection being in the amplification direction.

12. A radar system comprising, in combination, a transmitter for generating radio-frequency pulses; an antenna for radiating the pulses and receiving said pulses after reflection from reflecting objects; a receiver for amplifying and detecting the received pulses; and a circuit including a traveling wave tube for interconnecting the transmitter, antenna, and receiver, said transmitter being connected to said antenna through a portion of said tube, said traveling-wave tube being connected to said three components in a sense such that the received pulses are amplified by the traveling-wave tube and the transmitted pulses are not.

13. A radar system comprising, in combination, a transmitter for generating radio-frequency pulses; an antenna for radiating the pulses and receiving said pulses after reflection from reflecting objects; a receiver for amplifying and detecting the received pulses; a circuit for interconnecting the transmitter, antenna, and receiver including a traveling-wave tube for passing the transmitter pulses to the antenna and the received pulses to the receiver; and means for cutting off the electron beam of the traveling-wave tube during the transmission of said transmitter pulses through said tube.

14. A radar system comprising, in combination, a transmitter for generating radio-frequency pulses; an antenna for radiating the pulses and receiving return pulses after reflection from reflecting objects; and a cathode ray beam tube having a traveling-wave section interconnecting the transmitter and antenna in the non-amplifying direction thereof, whereby the transmitted pulses are not amplified by said traveling-wave tube section whereas the return pulses are amplified thereby, a detecting section downstream of the traveling-wave section for detecting the amplified return pulses and thereby intensity modulating the electron beam of said tube with said return pulses, and a display section for displaying the detecting pulses, said display section including a screen on which the intensity modulated beam impinges and means for sweeping said beam across said screen.

15. A radar system as set forth in claim 14, further including a second traveling-wave tube section between the first traveling-wave tube section and the detecting section; and an isolating means between the two traveling-wave sections.

16. In a radar system including a transmitter for producing radio-frequency pulses, an antenna for radiating the pulses and receiving echoes from reflecting objects, and a receiver to which the received pulses are applied, a duplexer comprising a traveling-wave tube having a first slow-wave structure to one portion of which the transmitted pulses are applied and to a second portion of which the antenna is coupled, the amplification direction of the slow-wave structure being from the second toward the first portion thereof; and a second slow-wave structure beyond the first slow-wave structure through which the electron beam of the traveling-wave tube passes after leaving the first slow-wave structure, said receiver being coupled to said second slow-wave structure.

17. In the system as set forth in claim 16, further including a drift tube between the first and second slow-wave structures through which said electron beam passes, for isolating the first and second slow-wave structures from one another.

18. In the system as set forth in claim 16, further including a local oscillator; and means for applying the local oscillator signal to the second slow-wave structure.

19. A traveling-wave tube comprising, a first slow-wave structure; radio-frequency coupling means at one end of the slow-wave structure to which a signal may be applied or from which a signal may be taken; radio-frequency coupling means at the other end of said slow-wave structure to which a signal may be applied; a second slow-wave structure downstream of the first; radio-frequency coupling means at one end of said second slow-wave structure; isolating means between said two slow-wave structures through which an electron beam may pass; and means for producing an electron beam and directing it through said first slow-wave structure, said isolating means and said second slow-wave structure, in the order named.

20. A traveling-wave tube comprising, a first slow-wave structure having an amplifying direction and a non-amplifying direction; first radio-frequency coupling means at one end of the slow-wave structure to which a signal may be applied; second radio-frequency coupling means at the other end of the slow-wave structure from which a signal may be taken, the direction from said first radio-frequency coupling means toward said second radio-frequency coupling means being the non-amplifying direction of said first slow-wave structure; a second slow-wave structure downstream of the first; isolating means being said two structures through which an electron beam may pass; and means for producing an electron beam and directing it through said first slow-wave structure, said isolating means and said second slow-wave structure in the order named.

21. A traveling-wave tube as set forth in claim 19, in which one of said slow-wave structures is a portion of a forward-wave amplifier and the other of said slow-wave structures is a portion of a backward-wave amplifier.

References Cited in the file of this patent

UNITED STATES PATENTS

| | | |
|---|---|---|
| 2,814,756 | Kenmoku | Nov. 26, 1957 |
| 2,890,373 | Chodorow | June 9, 1959 |
| 2,934,638 | Shigeru Mita | Apr. 26, 1960 |

OTHER REFERENCES

Aviation Week, September 17, 1956, "Radar Receiver Built Into New CRT Tube," page 75.